United States Patent [19]

Fey et al.

[11] Patent Number: 4,846,886
[45] Date of Patent: Jul. 11, 1989

[54] WATER BEADING-WATER SHEDDING REPELLENT COMPOSITION

[75] Inventors: Kenneth C. Fey, Midland, Mich.; John G. Price, South Glamorgan, United Kingdom

[73] Assignee: Dow Corning Corporation, Midland, Mich.

[21] Appl. No.: 190,742

[22] Filed: May 5, 1988

[51] Int. Cl.⁴ ............................ B32B 9/04; C09K 3/18
[52] U.S. Cl. ...................................... 106/2; 106/287.1; 106/287.19; 428/447
[58] Field of Search .................... 427/387, 384; 106/2, 106/12, 287.1, 287.23, 287.19; 428/447

[56] References Cited

U.S. PATENT DOCUMENTS

| | | | |
|---|---|---|---|
| 3,772,065 | 11/1973 | Seiler | 117/123 |
| 3,879,206 | 4/1975 | Nestler et al. | 106/12 |
| 4,342,796 | 8/1982 | Brown et al. | 427/136 |
| 4,753,977 | 6/1988 | Merrill | 524/588 |

Primary Examiner—Michael Lusignan
Attorney, Agent, or Firm—Jim L. DeCesare

[57] ABSTRACT

A water repellent composition for porous substrates formed by combining an alkylakoxysilane with a carrier selected from the group consisting of alcohols, mineral spirits, and glycol ethers, together with an effective amount of a surface depositing agent for producing on the surface of the porous substrate a water beading-water shedding surface coating, and a metal salt catalyst. The method of producing on a porous substrate a water beading-water shedding surface coating by applying to the porous substrate the foregoing composition is also disclosed.

8 Claims, No Drawings

WATER BEADING-WATER SHEDDING REPELLENT COMPOSITION

BACKGROUND OF THE INVENTION

This invention relates to a water repellent composition for pourous substrates formed by combining an alkylalkoxysilane with a carrier selected from the group consisting of alcohols, mineral spirits, and glycol ethers, together with an effective amount of a surface depositing water beading agent for producing on the surface of the porous substrate a water beading-water shedding surface coating, and a metal salt catalyst. More particularly, the invention relates to such compositions as well as to methods of producing on a pourous substrate a water beading-water shedding surface coating with the compositions.

Water resistance is an important factor in concrete and masonry construction. This is for the reason that moisture movement in concrete causes or contributes to problems such as expansion, shrinkage, cracking, staining, mildew, lowered resistance to freezing and thawing, chemical attack, corrosion of reinforcing steel, and damage to structures from settling. Because of these problems, various techniques have been used for water repellency including the surface treatment of concrete structures with repellents. Repellents that have been used in the past are oils, waxes, soaps, resins, and silicones, and they have been applied to the masonry surfaces by brush, roller, air spray, or airless spray techniques. One of the most prevalent category of repellent that has been used is silicones, and silicones in organic solvents have been found to be useful for brick, concrete, stucco, or terrazo surfaces. Exemplary of such prior art techniques for rendering concrete water repellent by means of silicones can be found in U.S. Pat. No. 3,772,065, issued Nov. 13, 1973, and U.S. Pat. No. 4,342,796, issued Aug. 3, 1982. A purportedly improved technique is disclosed in U.S. Pat. No. 3,879,206, issued Apr. 22, 1975, where certain additives are included with the silicones. However in contrast to the latter patent, the technique of the present invention differs in providing for a mixture of particular alkylalkoxysilanes; a combination of carrier materials; beading agents of particular compositions; an overall repellent composition of specific formulation; and a surface beading oil effect function and result. While the techniques of the prior art can penetrate and thereby render surfaces water resistant, they have not to any substantial degree done anything to block the pores on the surface of the structures since as previously noted, the repellent penetrates into the structure and then cures to a resinous matrix therewithin. The result is that such products do not bead water on the masonry surface in the fashion of the oils, and while the oils do not have the longevity or the penetrating power of silane, for example, the oils are visually striking in their ability to bead and shed surface water. Such disadvantages of the prior art are overcome with the present invention wherein there is provided compositions and methods in which the advantages of both the silane and the oil types or repellents are combined in order to impart to silanes the visual property and affect of water being repelled.

SUMMARY OF THE INVENTION

This invention is directed to a water repellent composition for porous substrates formed by combining an alkylalkoxysilane with a carrier selected from the group consisting of alcohols, mineral spirits, and glycol ethers, together with an effective amount of a surface depositing agent for producing on the surface of the porous substrate a durable water beading-water shedding surface coating, and a metal salt catalyst. In a preferred embodiment the water repellent is a forty percent solution of an alkylalkoxysilane with $C_1$ to $C_6$ alkyl groups on silicone, or a blend of alkylalkoxysilanes each having $C_1$ to $C_6$ alkyl groups on silicone, in an alcoholic or benzine carrier, and the metal salt catalyst is tetraisopropyltitanate. In the most specific embodiment of the present invention, the active composition excluding carrier is eighty-five percent by weight of alkylalkoxysilane with $C_1$ to $C_6$ alkyl groups on silicone, or a blend of alkylalkoxysilanes each having $C_1$ to $C_6$ alkyl groups on silicone, ten percent by weight of tetraisopropyltitanate, and five percent by weight of dibutyltindilaurate.

The invention is also directed to a method of producing on a porous substrate a water beading-water shedding surface coating by applying to the porous substrate a composition formed by combining an alkylalkoxysilane with a carrier selected from the group consisting of alcohols, mineral spirits, and glycol ethers, together with an effective amount of a surface depositing agent for producing on the surface of the porous substrate the durable water beading-water shedding surface coating, and a metal salt catalyst.

It is therefore an object of the present invention to chemically fix a water-repelling agent to a porous substrate such as concrete, limestone, and natural stone, in order to improve its resistance to the absorption of water as well as to impart to the surface thereof the ability to bead and to shed surface water.

It is a further object of the present invention to increase the cured crosslink density of a silicone matrix within a porous substrate such as concrete, limestone, and stone, as well as near its surface, in order to render the substrate water resistant, and at the same time provide it with the property of beading and shedding surface waters.

It is also an object of the present invention to provide a penetrating masonry water repellent composition for porous substrates such as concrete and limestone as well as other non-reactive masonry surfaces in which the repellent not only renders the substrate resistant to water penetration but in addition hinders the ingress of water at the surface by the process of beading.

These and other objects, features, and advantages of the herein described invention will become apparent from the following detailed description thereof wherein reference is made to the several tests, examples, and tables included therein.

DETAILED DESCRIPTION OF THE INVENTION

Masonry water repellents including alkylalkoxysilanes impart water repellent properties to such porous substrates as concrete and stone. Such category of repellent function in this fashion because of the fact that they penetrate into the masonry prior to the time that they are transformed into immobile resinous materials. However, due to the penetration of the repellent into the porous substrate, the repellent does not leave behind much of a surface layer on the porous substrate. As a result, the repellent, though effective to render the substrate water resistant, fails nevertheless to provide the substrate with a water beading coating on its surface of any significant durability. The compositions disclosed herein are intended to overcome this deficiency and by selection of appropriate materials for incorporation into the formulation, there can be achieved a good degree of water beading and water shedding function at the surface of the masonry structure because of polymer deposition on the surface of the masonry, in addition to the penetration of the repellent formulation to provide a deep section water barrier to water migration within the substrate itself.

The penetrating and water beading masonry water repellents of the present invention have particular application to the highway industry where water resistance is required for bridge decks, roads, and parking garages. In addition, such compositions are applicable especially to the building industry which makes use of masonry materials for walls such as natural stones which are porous and contain neutral mineral components including, for example, limestone, marble, and granite. These heretofore difficult to treat building materials can be effectively rendered water resistant with the compositions of the present invention and exhibit the added benefit of the water beading and water shedding function of the formulations which contributes to an improvement in repellency. While the highway industry applications of the formulations will be primarily concrete, the building industry applications of the formulations can range from brick, natural stone as noted above, cinder block, and stucco.

Generally, concrete, brick, and stucco, may be treated with an alkylalkoxysilane rendering the substrate water resistant. The latent alkalinity of such substrates promotes the hydrolysis and condensation of the silane into a resinous silicone matrix being permanently formed and deposited within the interior of the concrete, brick, or stucco substrate. Natural stone, such as limestone, is an exception in that it is relatively neutral and possesses no latent catalytic activity. As a consequence, the silane will not convert to a silicone as rapidly, nor will it affix itself to the calcareous interior surfaces of the substrate. The result is that there is provided very little or no water repellency or resistance to water absorption. This lack of reactivity of limestone is particularly noticeable when limestone aggregate is employed as a constituent in the preparation of concrete. In such instance, water readily penetrates along the interfacial boundaries between the concrete and the course limestone aggregate. Since the silane-based repellent does not adhere to the limestone, those portions of the concrete adjacent the aggregate are not rendered water resistant whereas the remainder of the concrete substrate is treated successfully. The water takes the path of least resistance into the mass of concrete, therefore, migrating along the side or through the aggregate of limestone particles. It is for these types of situations that the compositions of the present invention are useful along with their capacity to bead and shed water at the surface of the substrate.

The water beading-water shedding composition of the present invention includes as its basic ingredient a forty percent solution of an alkylalkoxysilane with $C_1$ to $C_6$ alkyl groups on silicone, or a blend of alkylalkoxysilanes each having $C_1$ to $C_6$ alkyl groups on silicone. It is preferably isobutyltrimethoxysilane in isopropanol. Also included in the composition is tetraisopropyltitanate referred to in the Tables below as TIPT. This material is a catalyst for converting methoxysilanes to resinous products by means of hydrolysis and condensation. For example, Table 1 shows that titantates are more effective at such conversions than are other types of metal salts known to be condensation catalysts.

TABLE 1

Catalysts Screened For Hydrolysis - Condensation Of Alkyl Alkoxy Silane[1]

| Catalyst[2] | 7 HR At 25° C., 50% RH | | 96 HR at 25° C., 50% RH | |
|---|---|---|---|---|
| | WT % Metal In Silane Sample | WT % Residue: ie. Hydrolyzed Silane[3] | WT % Metal In Silane Sample | WT % Residue: ie. Hydrolyzed Silane[3] |
| None | 0.00 | 6.4 | 0.00 | 1.0 |
| Titanium | | | | |
| TBT | 0.19 | 12.6 | 0.57 | 22.9 |
| TIPT | 0.19 | 14.3 | 0.57 | 23.8 |
| TIN | | | | |
| Stannous Octoate | 0.20 | 3.4 | 0.60 | 8.4 |
| DBTDA | 0.18 | 8.4 | 0.54 | 23.3 |
| DBTDL | 0.20 | 7.1 | 0.60 | 12.3 |
| DBTDO | 0.20 | 7.1 | 0.60 | 12.4 |
| Aluminum | | | | |
| Manalox ® 30A | 0.20 | 6.6 | 0.60 | 11.8 |
| 205 | 0.20 | 7.5 | 0.60 | 10.0 |
| Alusec ® 591 | 0.20 | 6.6 | 0.60 | 9.3 |
| 801 | 0.20 | 5.5 | 0.60 | 17.5 |
| Others | | | | |
| Manosec ® Mn16 | 0.20 | 3.4 | 0.60 | 8.1 |
| Zr18 | 0.20 | 4.7 | 0.60 | 6.3 |
| Ca10 | 0.20 | 2.3 | — | — |
| Co18 | 0.19 | 4.8 | 0.57 | 9.5 |
| Zn Octoate | 0.20 | 5.2 | 0.60 | 3.0 |
| A.F. Silane | 0.22 | 3.4 | 0.66 | 1.6 |

[1]Samples allowed to react in and/or evaporate from an open aluminum dish at 25° C., 50% RH.
[2]TBT = Tetrabutyltitanate
TIPT = Tetraisopropyltitanate
DBTDA = Dibutyltindiacetate
DBTDL = Dibutyltindilaurate
DBTDO = Dibutyltindioctoate
A.F. = Aminofunctional
[3]Avg. of 2 test values.

TABLE 1A

Confirmation of Catalyst Results Listed in Table 1.[1]

| | IBTMS[4] | | | WT % Silane/Hydrolyzed | | |
|---|---|---|---|---|---|---|
| Wt % Catalyst[2] | Conc (WT %) | Solvent | 5 HR | 22 HR | 96 HR | |
| 0 | 40 | IPA | 32 | 9 | Liquid State | |
| 0 | 40 | Mineral Spirits | 22 | 17 | Liquid State | |
| 3.5 DBTDL | 40 | IPA | 14 | 13 | Greasy Film | |
| 3.5 TIPT | 40 | IPA | 27 | 25 | Dry, Hard Film | |

[1]Samples allowed to react in and/or evaporate from open Petrie dishes at 50% RH, 25° C.
[2]WT % of catalyst (as supplied) in a 40% silane/solvent solution.
[3]Average value from (2) separate sets of tests.
[4]Reacidified using HCl-L (10 ppm).

In Table 1A there is set forth data supporting the results obtained and shown in Table 1. The titanate catalyst tetraisopropyltitanate(TIPT) yielded a dry film after ninety-six hours of ambient exposure, while the non-catalyzed sample as well as the tin-catalyzed sample, dibutyltindilaurate(DBTDL), remained liquid and semi-solid, respectively. The catalyst comparisons set forth in Tables 1 and 1A were not conducted on masonry surfaces therefore the time required in these tests to achieve a complete cure is longer than normally would be expected, for cure is accelerated on masonry because of the alkalinity of the material and its greater surface area. Yet, the foregoing data compiled from procedures wherein reactions and evaporation of isobutyltrimethoxysilane(IBTMS) in otherwise open laboratory dishes was a reliable format for screening potentially viable catalyst compositions.

TABLE 2

MWR Test Solutions: Blends of $MeSi(OCH_3)_3$ And $iBuSi(OCH_3)_3$

| Solution | $MeSi(OCH_3)_3$ | $iBuSi(OCH_3)_3$ | TIPT[1] | IPA | % By WT[2] MWR Agents | % Solids of MWR Agents |
|---|---|---|---|---|---|---|
| 1 | 90.0 | 0 | 10 | 150 | 40 | 18.86 |
| 2 | 76.5 | 13.5 | 10 | 150 | 40 | 19.51 |
| 3 | 67.5 | 22.5 | 10 | 150 | 40 | 19.94 |
| 4 | 58.5 | 31.5 | 10 | 150 | 40 | 20.37 |
| 5 | 0 | 90.0 | 10 | 150 | 40 | 23.17 |

[1]Tetraisopropyltitanate
[2]Includes MTM, IBTMS, TIPT

TABLE 3

Mineral Spirits Use In A Silane-Based MWR As A Substitute For Alcohol

| Solution[1] | MTM | IBTMS | IPA | Mineral Spirits | Butyl Cellosolve ® | TIPT |
|---|---|---|---|---|---|---|
| 6 | — | 40 | 60 | — | — | — |
| 7 | 30 | 10 | 18 | 37 | 13 | 5 |
| 8 | — | 36 | 60 | — | — | 4 |

[1]All samples acidified with 10 ppm HCl.

TABLE 4

Silane Blend Test Series: Data Summary

| MWR Solution | Application Rate Of MWR (sq ft/gal) | Depth of MWR Penetration (inches) | 21 Day Immersion Test Wt. Gain (g.) | 21 Day Immersion Test % $H_2O$ Excluded[1] | 63 Day Immersion Test Wt. Gain (g.) | 63 Day Immersion Test % $H_2O$ Excluded[1] |
|---|---|---|---|---|---|---|
| Control | — | — | 4.64 | — | 4.95 | — |
| A. Sand Cement Cubes Treated[2] 24 HR After MWR Solution Preparation. | | | | | | |
| 1 | 377 | 0.0518 | 4.38 | 5.60 | 4.76 | 3.84 |
| 2 | 368 | 0.0498 | 2.45 | 47.11 | 3.90 | 21.21 |
| 3 | 349 | 0.0596 | 2.07 | 55.39 | 3.55 | 28.28 |
| 4 | 364 | 0.0489 | 1.96 | 57.84 | 3.40 | 31.31 |
| 5 | 361 | 0.0577 | 1.25 | 73.06 | 2.39 | 51.70 |
| B. Cubes Treated[2] After 7 Days Storage Of MWR Solutions At Ambient Conditions | | | | | | |
| 1 | 371 | 0.0250 | 4.32 | 6.90 | 4.63 | 6.40 |
| 3 | 354 | 0.0742 | 1.94 | 58.20 | 3.25 | 34.40 |
| 5 | 369 | 0.0714 | 1.05 | 77.37 | 2.04 | 58.70 |
| C. Cubes Treated[2] After 7 Days Storage Of MWR Solutions. This Set Of MWR Solutions Was Also Acid Equilibrated With HCl. | | | | | | |
| 1 | 336 | 0.0156 | 4.40 | 5.17 | 4.69 | 5.20 |
| 3 | 343 | 0.0615 | 1.69 | 63.75 | 3.11 | 37.10 |
| 5 | 330 | 0.0753 | 1.12 | 75.82 | 2.08 | 57.90 |
| D. Mineral Spirits Series, Sand Cement Cubes Treated 24 HR After MWR Solution Preparation. | | | | | | |
| 6 | 337 | 0.0890 | 1.69 | 64.05 | 2.39 | 51.71 |
| 7 | 312 | 0.0940 | 1.47 | 68.77 | 2.05 | 58.60 |
| 8 | 368 | 0.0938 | 1.03 | 77.84 | 1.61 | 67.40 |

[1]Exclusion value is relative to an untreated control.
[2]2 × 2" sand cement cubes. Stored at laboratory ambient conditions for 7 days prior to treating. Cubes dipped into MWR solutions for 10 seconds to apply treatments, cured 4 HR at 25° C., 50% RH before testing for beading.

In Tables 2 through 4 there is set forth data resulting from extensive testing conducted for evaluation of certain blends of materials. For example, in Table 2 there is set forth a series of five solutions that were prepared being blends of methyltrimethoxysilane(MTM), isobutyltrimethoxysilane(IBTMS), and tetraisopropyltitanate(TIPT). These five solutions as set forth in Table 2 form the basic solutions from which three sub-sets of solutions were prepared and which are set forth in Table 4. Thus, in Table 4 a first sub-set of solutions is indicated at "A.1–5", and these particular solutions were not mixed with HCL so that no transalkoxylation of isopropanol (IPA) with the silane methoxy group would occur. Transalkoxylation will yield an alkylalkoxysilane having a high vapor pressure because of the exchange which places isopropoxy onto the silane in place of the original methoxy group. This isopropoxylated silane should evaporate slower from the masonry during application and hence penetrate more deeply. Set "A" of the solutions was applied to concrete within twenty-four hours of preparation. Set "B.1,3, and 5" of solutions in Table 4 is the same three of the five solutions of Set "A" except that the samples in Set "B" were allowed to equilibrate at room temperature for seven days before they were applied to concrete. Set "C.1,3, and 5" of solutions in Table 4 again is the same three of the five Set "A" solutions except that the Set "C" solutions included HCL in order to facilitate transalkoxylation. The solutions of Set "C" were allowed seven days of equilibration prior to being tested. In Table 3 a series of three samples "6-8" were prepared as indicated, and this set is also shown in Table 4 as set "D.-8". This Set "D" of solutions formed the basis of evaluations of the effects of employing mineral spirits in the formulations of the present invention in place of isopropanol(IPA) as the carrier for the silane. The tests conducted in order to compile the foregoing data set forth in Tables 2–4 were carried out using sand cement cubes rather than limestone since differences in performance are more apparent on sand than limestone, and solutions that rendered sub-par performance on sand would render even less performance on limestone. Data on the tests are summarized in Table 4, and particular note should be taken of the comparable performance of solution "D.7" which included a carrier combination of alcohol-mineral spirits-glycol ether. It is believed that in actual use conditions, such a solvent blend will affect slower silane evaporation from the masonry being treated as well as assist in displacing water that typically would be present in the masonry. In Table 1 it is noted that the terms "Manalox", "Alusec", and "Manosec" appearing therein are trademarks covering proprietary catalytic compositions. In Table 3, the term Butyl "Cellosolve" is a trademark for ethylene glycol monobutyl ether.

TABLE 5

Surface Depositing Agents As Surface Water Beading Additives

| Beading Additive | | Beading Test[2] On Concrete[3] | |
|---|---|---|---|
| Type | % NVM Of Additive | Beading Performance | |
| | | 0.1% Level[1] | 1.0% Level[1] |
| Agent "a" | 100% | C | B |
| Agent "d" | 35 | B | A |
| Agent "b" | 50 | D | D |
| Agent "e" | 74 | D | D |
| Agent "c" | 5 | D | D |
| Agent "f" | 10 | D | C |
| Agent "g" | 10 | C | B |
| Agent "h" | 100 | D | D |
| Control[4] | — | D | D |

[1]WT % of beading additive added to total Control Solution. Sample solutions applied to concrete by dipping: 10 second immersion. Cure 36 hours at 25° C., 50% RH.
[2]A: No wetting after 120 min.
B: No wetting after 60 min.
C: No wetting after 30 min.
D: No wetting after 18 min.
[3]¾" × 1¼" × ¾" cut concrete.
[4]Isobutyltrimethoxysilane in isopropanol (IBTMS/IPA).

TABLE 6

Surface Depositing Agents: Confirmation Of H₂O Beading Tests From Table 5

| MWR Composition[3] | | | Beading |
|---|---|---|---|
| IPA | Other Solvent[4] | Beading Agent | Test: Time To Wetting |
| IBTMS | | | |
| 40[2] | 60 | — | < 5 min. |

TABLE 6-continued

Surface Depositing Agents: Confirmation Of H₂O Beading Tests From Table 5

| MWR Composition[3] | | | Beading |
|---|---|---|---|
| IPA | Other Solvent[4] | Beading Agent | Test: Time To Wetting |
| 40 | — | 60 | — | 60 + |
| 35 | 60 | 5, Agent "d" | 60 + |
| 35 | 60 | 5, Agent "g" | 60 + |
| 36.5 | 60 | 3.5, TIPT | 60 + |
| 36.5 | 60 | 3.5, DBTDL | 60 + |
| Comparative Products | | | |
| 40 | 60 (EtOH)[5] | — | 10 min |
| 35 | 60 (EtOH) | 5, Agent "d" | 60 + |
| 36.5 | 60 (EtOH) | 3.5, DBTDL | 60 + |

[1]Test Discontinued after 60 minutes.
[2]Control IBTMS/IPA
[3]2 × 2" sand cement cubes. Stored at laboratory ambient conditions for 7 days prior to treating. Cubes dipped into MWR solutions for 10 seconds to apply treatments. cured 4 HR at 25° C., 50% RH before testing for beading.
[4]Butyl Cellosolve ®
[5]Chemtrete ® From Trocal Division of Dynamit Nobel.

With reference now to Table 5, there is set forth therein data resulting from tests conducted with isopropanol solutions of isobutyltrimethoxysilane containing several beading agents. The beading agents used in these tests and set forth in Tables 5 and 6 which refer to them are set forth structurally and chemically as follows:

a. Dibutyltindilaurate (DBTDL)
b. $H_2NCH_2CH_2NH(CH_2)_3Si(OMe)_3$. An aminofunctional silane.
c. A fluorosilicone fluid/1000 cps of the formula:

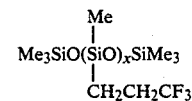

d. An amine salt functional siloxane copolymer.
e. Trimethylsilyl endcapped polysilicate.
f. An 800 dp polydimethylsiloxane fluid of the formula:

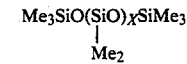

where X=0 to 800.

g. RTV (room temperature curable) silicone rubber.
h. $(Me_3SiO)_4Si$. Tetrakis(trimethylsiloxy)silane.

With respect to Table 5 it will be observed that beading Agents "d", dibutyltindilaurate, and "g" performed well. The results of Table 5 were confirmed by a series of further tests conducted with the confirming data being summarized in Table 6. In Table 6, the concluding tests indicated that not only were Agents "d", dibutyltindilaurate(DBTDL), and "g" good performers from the standpoint of beading and water shedding, but that in addition this capability was exhibited by tetraisopropyltitanate(TIPT). Table 6 and the tests conducted to establish this data also indicated that better beading and water shedding could be obtained by substituting a glycol ether solvent (Butyl "Cellosolve") for isopropanol in the composition. A comparative material "Chemtrete" a forty percent solution of isobutyltrimethoxysilane in ethanol and a trademark of the Trocal Division of Dynamit Noble Aktiengesellschaft, Troisdorf, Germany, functioned in a fashion similar to the IBTM- S/IPA control both in and out of the presence of beading agents. From the data available it is believed that levels of beading agent greater than one percent by weight will be required, and that levels of up to about fifteen percent can be employed for sand concrete, for example. With concrete, levels of from about ten to fifteen percent are preferred by weight, with combinations of beading agents being employed such as tetraisopropyltitanate(TIPT) with each of Agent "d" and dibutyltindilaurate(DBTDL). The most preferable combination has been found to be a formulation of by weight eighty-five percent isobutyltrimethoxysilane(IBTMS), ten percent tetraisopropyltitanate(TIPT), and five percent dibutyltindilaurate(DBTDL). Addition of beading and water shedding agents at levels of five to fifteen percent by weight are also contemplated herein.

The masonry water repellent(MWR) compositions of the present invention including their capability of water beading and surface water shedding have wide application including for example, concrete products such as precast products, blocks, brick, pipe, prestressed products, structural concrete, and highway surfacing; floor and wall tiles, roofing tile, and structural tiles; in Portland cement concrete work containing coarse limestone aggregate as footings, poured foundations, paving, steps, curbs, structural products, molded, reinforced, and prestressed concrete products such as blocks, bricks, pipes, panels, and beams; exterior and interior plaster; stucco; and terrazo.

It will be apparent from the foregoing that many other variations and modifications may be made in the structures, compounds, compositions, and methods, described herein without departing substantially from the essential concepts of the present invention. Accordingly, it should be clearly understood that the forms of the invention described herein and set forth in the included Tables are exemplary only and are not intended as limitations on the scope of the present invention.

That which is claimed is:

1. A water repellent composition for porous substrates formed by combining an alkylalkoxysilane selected from the group consisting of an alkylalkoxysilane with $C_1$ to $C_6$ alkyl groups on silicon, or a blend of alkylalkoxysilanes each having $C_1$ to $C_6$ alkyl groups on silicon, with a carrier selected from the group consisting of (i) alcohols, (ii) mineral spirits, and (iii) glycol ethers, together with an effective amount of a surface depositing water beading agent, and a metal salt catalyst, the surface depositing water beading agent being selected from the group consisting of:

a. 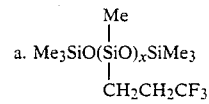

where $X = 10$ to $100$, b. an amine salt functional siloxane copolymer, c. trimethylsilyl endcapped polysilicate, d. 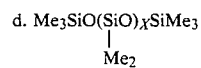

where $x = 0$ to $800$, e. a room temperature curable silicone rubber, and f. $(Me_3SiO)_4Si$, the alkylalkoxysilane being a five to forty percent solution of alkylalkoxysilane in the carrier, and the surface depositing water beading agent is present at levels greater than one percent by weight of active components.

2. The composition of claim 1 wherein the metal salt catalyst is tetraisopropyltitanate.

3. The composition of claim 1 wherein the surface depositing water beading agent is present at levels up to fifteen percent by weight of active components.

4. The composition of claim 3 wherein the surface depositing water beading agent is present at levels in the range of ten to fifteen percent by weight of active components.

5. The composition of claim 3 wherein the surface depositing water beading agent is present at levels in the range of five to fifteen percent by weight of active components.

6. The composition of claim 1 wherein the carrier is a glycol ether.

7. The composition of claim 1 wherein the carrier is an alcohol-mineral spirit-glycol ether combination.

8. The composition of claim 7 wherein the carrier is a combination by weight of eighteen percent isopropanol, thirty-seven percent mineral spirit, and thirteen percent ethylene glycol monobutyl ether.

* * * * *